Aug. 26, 1969  R. DRAKE  3,463,506
STEERING MEANS FOR LIFT TRUCKS
Filed July 20, 1966  5 Sheets-Sheet 1

INVENTOR
RONALD DRAKE
BY *Abraham C. Saffitz*
ATTORNEY

INVENTOR
RONALD DRAKE
BY *Abraham A. Saffitz*
ATTORNEY

Aug. 26, 1969  R. DRAKE  3,463,506
STEERING MEANS FOR LIFT TRUCKS
Filed July 20, 1966  5 Sheets-Sheet 4

INVENTOR
RONALD DRAKE
BY
ATTORNEY

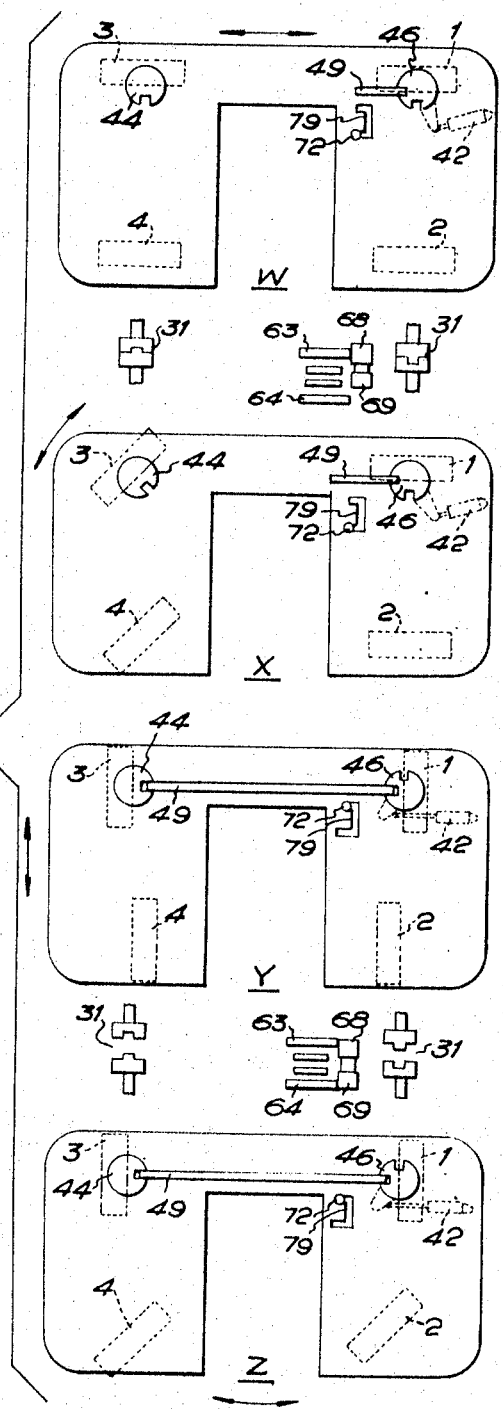

3,463,506
Patented Aug. 26, 1969

3,463,506
STEERING MEANS FOR LIFT TRUCKS
Ronald Drake, Wakefield, England, assignor to Joshua Shaw & Sons Limited, Batley, England
Filed July 20, 1966, Ser. No. 566,517
Claims priority, application Great Britain, July 30, 1965, 32,733/65
Int. Cl. B62d 5/10, 7/16
U.S. Cl. 280—91                                2 Claims

ABSTRACT OF THE DISCLOSURE

A vehicle steering drive mechanism operated by the driver which controls a pair of front steerable ground wheels and a pair of rear steerable ground wheels on pivotable supports mounted to the chassis comprising two endless flexible chains, driving means, clutch means engaging the pivotable support with the chains and locking means so as to permit selection of a pair of end wheels or a pair of side wheels for movement of the vehicle longitudinally or laterally.

---

This invention relates to steering means for fork-lift or other forms of lift trucks or other vehicles having at least one pair of front wheels and one pair of rear wheels. Such trucks require to be particularly maneuverable over the ground in order to operate in confined spaces and to enable them to load from and unload onto positions which may be difficult to approach.

With a view to improving the degree of control over the direction of movement of lift trucks and other vehicles which are required to operate in narrow confines, it has been proposed to connect some or all of the ground wheels to a steering system embodying chain transmission and in which one or more chains transmit the steering movement to different wheels in different directions in order to turn the vehicle bodily so as to face in a different direction. Such arrangements enable the vehicle to be swung around to face in a new direction in a smaller space than would be required with a normal steering system, but the general movement of the vehicle is in a longitudinally forwards or backwards direction.

The chief object of the present invention is to still further increase the maneuverability of a vehicle by providing it with a steering means by which it can be steered during movement in a generally longitudinal direction (that is lengthwise of the vehicle chassis) but by which it can alternatively be steered so as to move in a generally lateral direction (that is sideways) without turning the vehicle to face in that direction. It will be clear that a vehicle thus equipped can be driven along narrow aisles or passages and easily moved into and out of narrow branch passage with less space than would be needed if the vehicle had to be swung round into the new direction of movement. Also this invention can be applied with great advantage to lift trucks of the side-loading kind in which front and rear portions of the chassis are connected only by a narrow frame structure at one side of the chassis, since the chain or like flexible steering transmission element can be led from the steering wheel to one or more pairs of front and rear wheels more easily than could be done with conventional steering transmission members.

In the following description and claims the terms "near side" and "off side" are used in the sense of the side of the vehicle which is nearest to the side of the road along which it would be driven when on a road.

The steering means according to the present invention therefore includes one or more endless chains or like flexible transmission elements arranged to transmit steering movement from the steering control wheel to the steerable ground wheels via chainwheels or the like associated with the supports for said ground wheels, and means for turning said steerable ground wheels into such positions that for movement of the vehicle in a generally longitudinal direction steering is done through one or more pairs of ground wheels at the front or back, while for movement of the vehicle in a generally lateral direction steering is done through the ground wheels on one side only of the vehicle with the vehicle moving bodily sideways.

This steering arrangement gives a good turning range for movement in the generally longitudinal direction, but when it is desired to change the direction of movement to a generally lateral one the steering control can be transferred to the wheels on one side of the truck, all the wheels being turned into the lateral direction.

Means will be provided for connecting and disconnecting the steering drive to and from certain of the ground wheel supports, for turning certain of the wheels from the longitudinal to the lateral direction and vice versa, and for locking the non-steerable wheel supports in either of said directions as required.

In order that the invention may be fully and clearly comprehended, the same will now be described with reference to the accompanying drawings, which illustrate the principle of the steering system of this invention and also illustrate merely by way of example one constructional arrangement thereof suitable for application to a lift-truck of the aforesaid side-loading kind.

Figure 1:
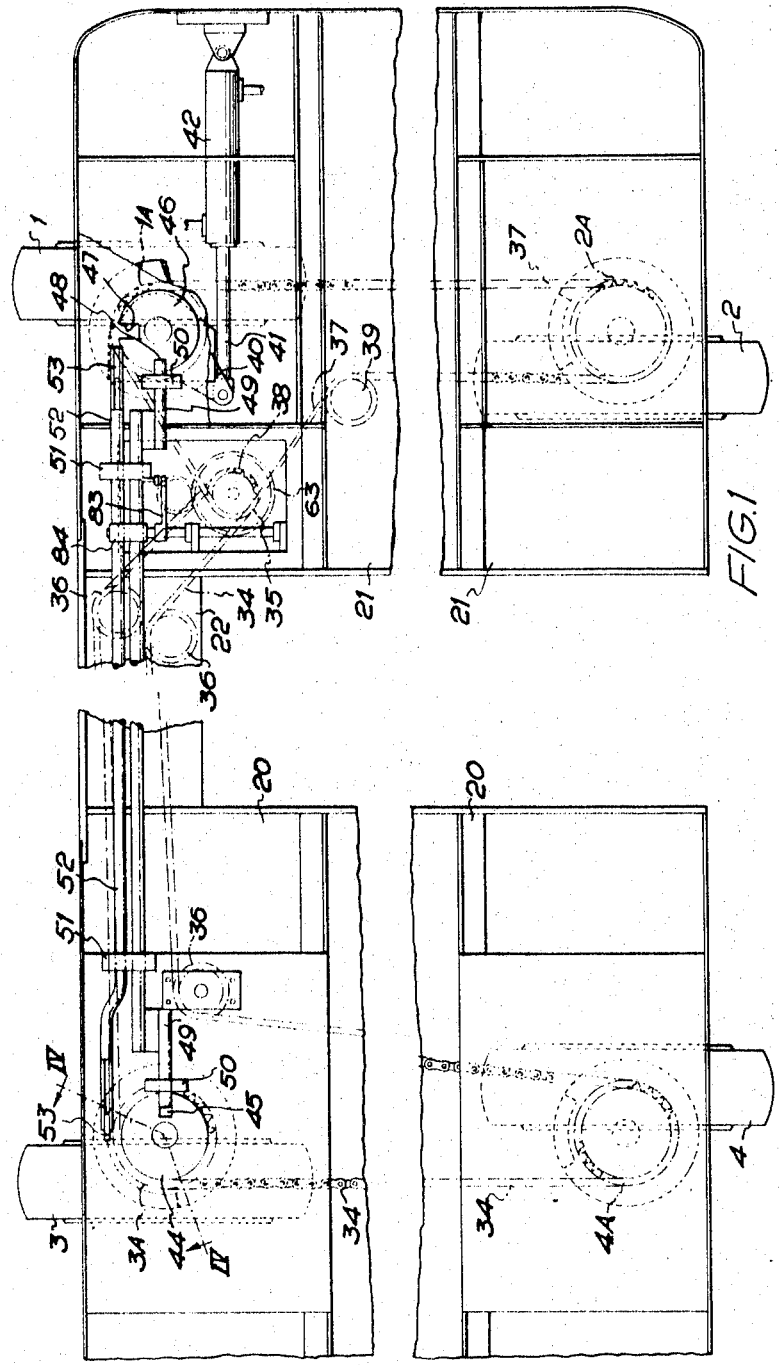
FIGURE 1 is a broken plan view of the truck chassis, the upper portion of the figure having parts of the load-carrying deck or platform cut away to show details below it; and the ground wheels being shown in the positions for lateral movement of the truck steered by the near side wheels.
Figure 4:
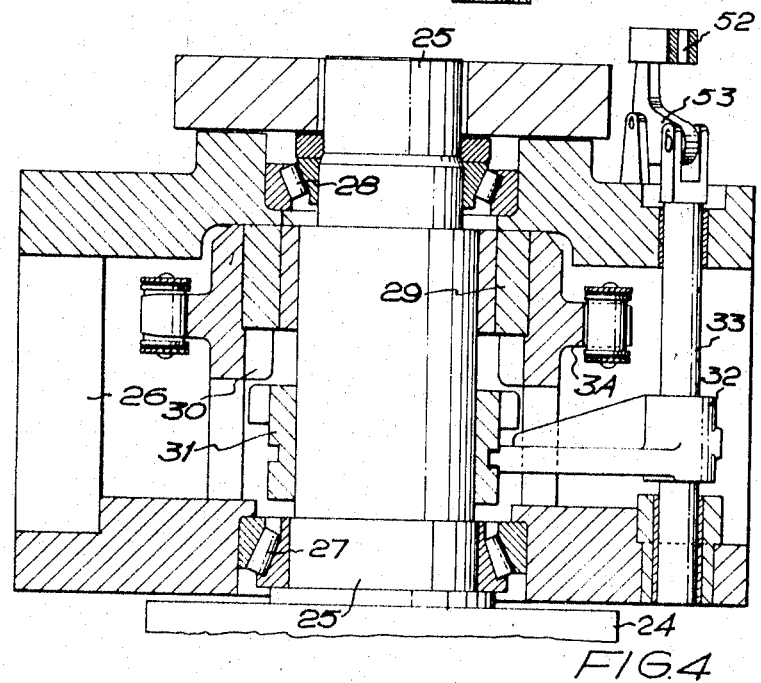
Figure 5:
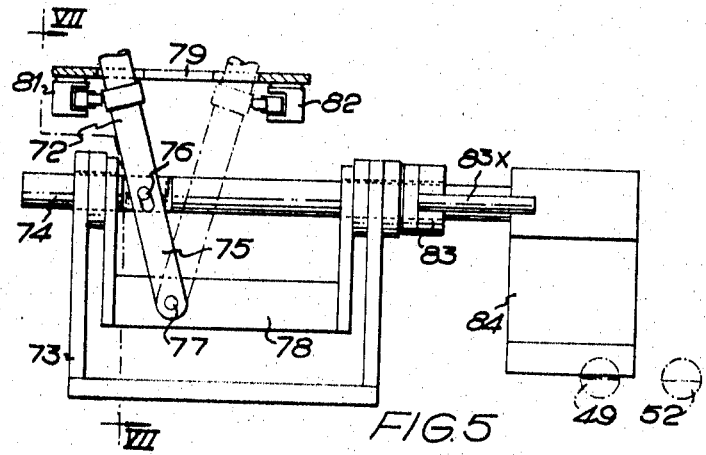
Figure 6:
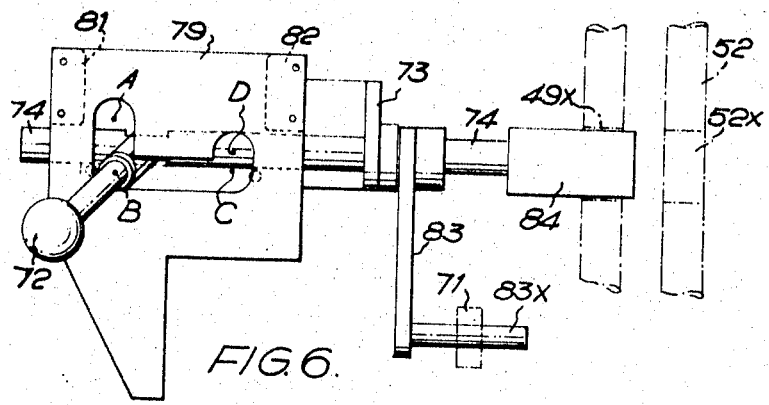
Figure 7:
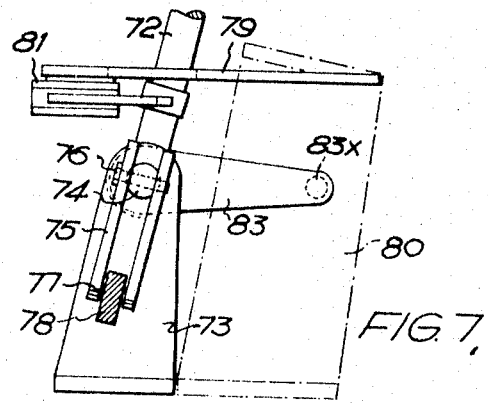

FIGURE 4 a detail section taken on the line IV—IV in FIGURE 1 but to a larger scale, showing the off side front wheel mounting with an associated clutch and locking disc;

FIGURES 5, 6 and 7 are respectively an elevation, a plan and a section taken on the line VII—VII in FIGURE 5, of a steering selector mechanism;

FIGURE 8 illustrates by four diagrams the operation of the steering means described with reference to the preceding figures.

Figure 2:
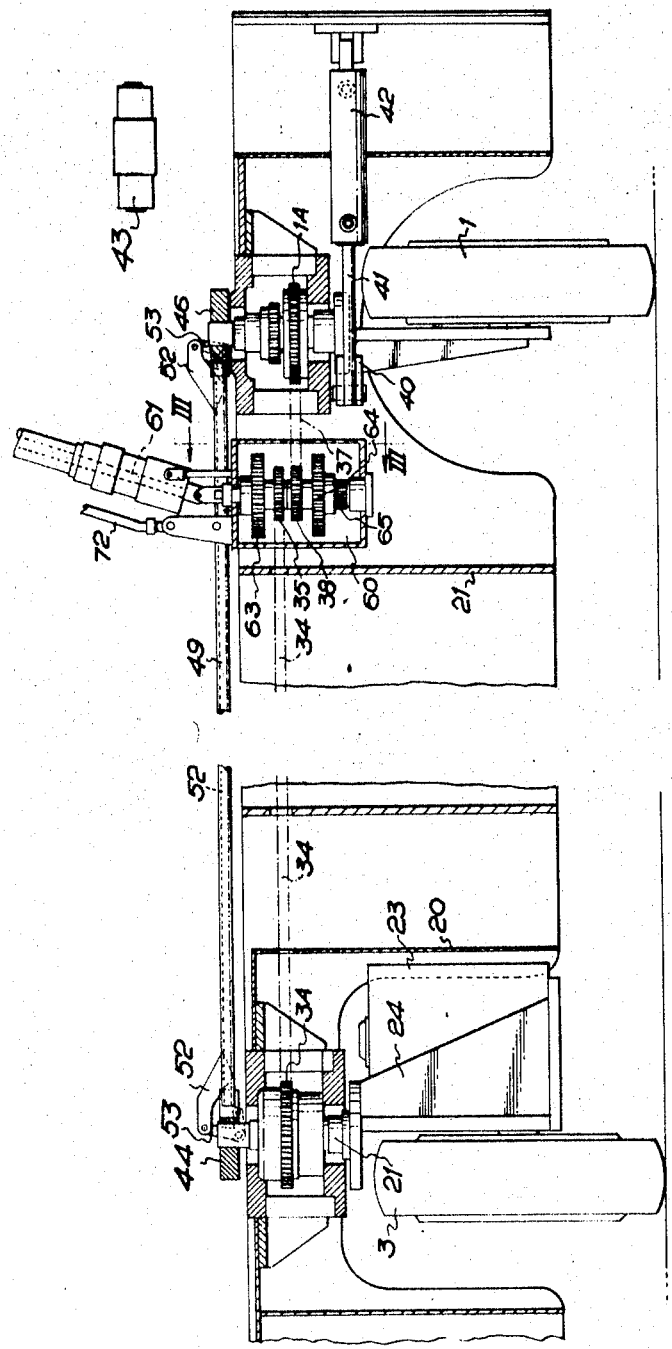
FIGURE 2 is a side elevation of the upper portion of FIGURE 1, showing also the steering column and a control lever, and with one side of a steering box removed.

Referring first to FIGURES 1 and 2, the truck chassis has front and rear portions 20, 21 connected only along the off side by a frame 22, leaving a recess for lateral movement of the load-lifting mast structure as is well known. The ground wheels 1, 2, 3 and 4 are mounted on the chassis so that they can be turned bodily about vertical axes. The two front wheels 3 and 4 are shown as being each driven independently by an electric or fluid motor 23 mounted in a wheel bracket 24 and drivably connected to the wheel in any suitable manner.

The off side front wheel mounting (see FIGURE 4) consists of a vertical pivotal support spindle 25 secured to the bracket 24 and mounted in a housing 26 on the chassis by bearings 27, 28. This spindle 25 has mounted on it a chain wheel 3A which is rotatable upon a bush 29 and which has dog teeth 30 engageable by a sliding clutch dog 31 splined on the spindle 25. The dog 31 can be engaged and disengaged with the chain wheel by a clutch fork 32 on a vertically movable clutch rod 33 as will be explained later.

The off side rear wheel mounting is substantially the same as that just described except that the chain wheel 1A is located below the clutch dog instead of above it. The two mountings for the near side wheels 2 and 4 include items 25, 26, 27 and 28 but the chain wheels 2A, 4A are secured upon the spindles 25 and there is no clutch mechanism.

The front chain wheels 3A, 4A are connected by an endless steering chain 34 with a sprocket 35 in the steering box 60, the chain being guided by jockey pulleys 36 so as to extend within the frame 22. Likewise the rear chain wheels 1A, 2A are connected by an endless steering chain 37 with a sprocket 38 in the steering box, being guided by jockey pulley 39.

The pivotal support for the off side rear wheel 1 has secured to it an arm 40 connected to the ram rod 41 of a double-acting hydraulic cylinder 42 which is arranged to swivel the two rear wheels through 90° into either their lateral position shown in FIGURE 1 or their longitudinal position as will be explained later. This cylinder is connected in conventional manner with the hydraulic power supply of the truck and its operation is controlled by a double-solenoid operated valve 43 indicated in FIGURES 2 and 3 and to be referred to later.

The support spindles 25 for the off side wheels 1 and 3 have secured on them locking discs 44, 46, disc 44 having a deep recess 45 and disc 46 having a similar deep recess 47 and also a shallow recess 48 set at 90° round the disc from recess 47 (see FIGURE 1). These recesses can be engaged by opposite ends of a locking rod 49 which is slidable longitudinally of the truck in guide blocks 50, 51 (shown only in FIGURE 1) by means described hereinafter.

In FIGURES 1 and 2 there is also shown a clutch-operating rod 52 also slidable longitudinally in the guide block 51 by means described hereinafter, the opposite ends of the rod being connected through bell-crank levers 53 to the clutch rods 33 on the two off side wheel mountings in such a manner that rearward operation of rod 52 disengages both clutches (as shown in FIGURES 2 and 4) whilst forward operation of rod 52 engages both clutches.

Figure 3:
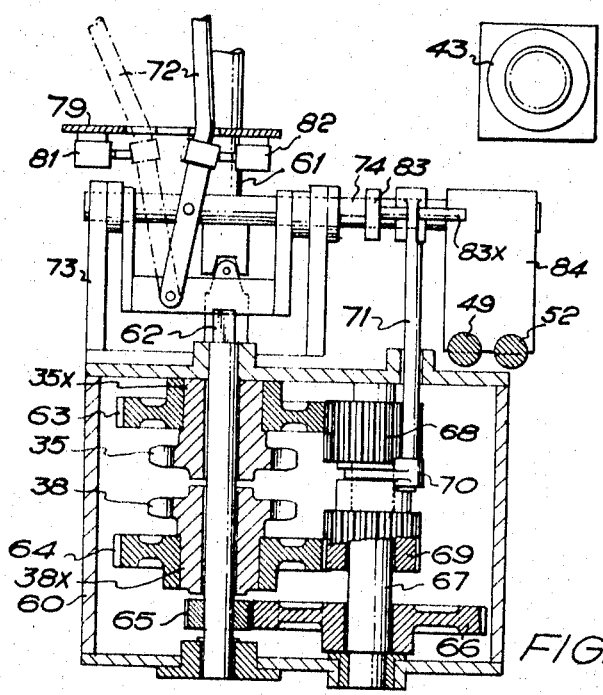
FIGURE 3 is a detail section taken on the line III—III in FIGURE 2 but to a larger scale.

As shown in FIGURES 2 and 3, the steering rod 61 is connected to the squared end of a vertical drive shaft 62 rotatably mounted in the steering box 60. The sprocket wheels 35, 38 are rotatably mounted on this shaft and on their sleeves 35X, 38X are secured respectively two spur gears 63, 64. A pinion 65 secured on the shaft 62 drives a spur gear 66 secured on a countershaft 67. Slidably mounted on the splined part of countershaft 67 is a compound gear assembly having two pinions 68, 69 engageable respectively with the gears 63, 64 when in the position shown in FIGURE 3. In this position the steering wheel operates both steering chains, but by raising the compound gear assembly through a gear shift fork 70 and rod 71 the steering wheel only operates the front chain 34.

The locking rod 49, clutch-operating rod 52 and selector rod 71 are all operated mechanically by movement of a control or selector lever 72 as illustrated more particularly in FIGURES 5 to 7. A bracket 73 secured on the steering box 60 supports a horizontally slidable selector shaft 74. The forked lower end 75 of lever 72 is pivotally connected at 76 to the shaft 74 and is pivotally mounted at 77 on a yoke 78 which can swing upon the shaft 74 sideways as seen in FIGURE 7. By this arrangement the lever 72 can be moved in a longitudinal direction relative to the shaft 74 and can also be rocked at right angles to that direction. The lever 72 is guided in a selector gate 79 supported from the steering column bracket 80 and can occupy any one of four positions A, B, C, D. In positions B and C it operates one of two micro-switches 81, 82 controlling the solenoids of valve 43 already referred to.

On selector shaft 74 is secured a gear shift lever 83 connected to operate through rod 71 the gear shift fork 70, lever 83 having a long pin 83X slidable through the eye of rod 71. Also secured on that shaft is a block 84 which can be slid into engagement with recesses 49X, 52X in rods 49 and 52, engaging either rod 49 alone (see FIGURES 5 and 6) or both together (see FIGURES 1 and 3).

The operation of the steering mechanism described above is as follows, reference being made particularly to FIGURE 8 in which certain parts of the mechanism are indicated by the same reference numerals as are used for those parts in the other figures.

For generally longitudinal travel as shown in diagram W, selector lever 72 is in position A. This engages both clutches 31, causes locking rod 49 to engage disc 46 and thereby lock the supports for the rear wheels 1, 2 so that the latter are in their longitudinal positions and connects the steering wheel to the front steering chain only (see first mechanism diagram). Thus the truck can be steered by its front wheels which are arranged to steer through at least 90° on each side of the front central position to give good steering for forward and backward travel and for turning the truck in a very small circle.

In order to transfer the steering control to the near side wheels, the front wheels 3, 4 are turned to the left past the position shown in diagram X until they are at right angles as shown in diagram Y with locking disc 44 in the position shown. Then lever 72 is rocked to position B to push locking rod 49 forwards to lock disc 44 and unlock disc 46, at the same time shifting gears 68, 69 to connect the steering wheel to both steering chains.

Movement of lever 72 from position B to position C (see broken lines in FIGURE 5) actuates micro-switch 82 to cause ram rod 41 to turn the supports for the rear wheels 1, 2 (connected by chain 37) through 90° into their lateral positions as shown in diagram Y. This brings the shallow recess 48 of disc 46 into alignment with locking rod 49 and also causes block 84 to engage with clutch-operating rod 52.

When lever 72 is rocked into position D (a smaller angular movement than from A to B), rods 49 and 52 are moved rearwards to positions in which rod 49 locks both discs 44, 46 as shown in diagram Y and rod 52 disengages both clutches, but leaving both steering chains operable by the steering wheel (see second mechanism diagram). The truck can now be steered by its near side wheels (see diagram Z) which are arranged to steer through at least 45° on each side of the lateral central position.

To revert to front wheel steering, the selector lever 72 is moved progressively back to position A to enable the reverse sequence of operations to be carried out, micro-switch 81 being actuated to return the rear wheels to their longitudinal positions when the lever, 72, passes through position B.

Such an arrangement gives a four-way or universal steering control at the choice of the driver to suit a very wide range of circumstances and situations.

It is to be understood that the swivelling of the rear wheels might be done by other means than a hydraulic ram, for example a rack and pinion or toothed quadrant and a hydraulic motor. Also that the same method of steering could be applied to a vehicle with more than four wheels, for example a six wheeler, preferably one pair at the front or rear being used for steering in the longitudinal direction.

I claim:

1. In a vehicle having at least one pair of front steerable ground wheels and one pair of rear steerable ground wheels, a steering system comprising in combination pivotal supports mounting said steerable ground wheels on the vehicle chassis, a steering drive transmission member mounted about each of said pivotal supports for pivoting the latter, a steering drive means for operation by the driver, a first endless flexible transmission element connecting said steering drive means with said transmission members for one pair of front or rear pair of steerable ground wheels, a second endless flexible transmission element connecting said steering drive means with said transmission members for said other pair of said front or rear pair of steerable ground wheels, clutch means mounted about a front one and a rear one of said pivotal supports on one side of the vehicle for coupling the corresponding steering drive transmission members to their respective pivotal supports, locking means mounted about said last mentioned two pivotal supports for locking the pivotal supports of said front pair or said rear pair of steerable ground wheels and alternatively of one of each pair or the same side of the vehicle to render such pair non-steerable, and selector means for controlling the operation of said steering drive means, said clutch means and said locking means to render the vehicle steerable in a general longitudinal direction by said front or rear pair of ground wheels through said first endless flexible transmission member and alternatively steerable in generally lateral direction by one front wheel and one rear wheel of said pairs of ground wheels on the same side of the vehicle.

2. In a vehicle having at least one pair of front steerable ground wheels and one pair of rear steerable ground wheels, a steering system as claimed in claim 1 where said steering drive means includes a mechanism for coupling it at choice either to both of said endless flexible transmission elements or to said front one only.

References Cited
UNITED STATES PATENTS

| | | | |
|---|---|---|---|
| 2,842,376 | 7/1958 | Krilanovich | 280—91 |
| 3,087,564 | 4/1963 | Quayle | 280—91 X |
| 3,090,516 | 5/1963 | Seymour et al. | 280—91 X |
| 3,198,541 | 8/1965 | Christenson et al. | 280—99 X |
| 3,297,337 | 1/1967 | Sargent | 280—91 |
| 3,337,231 | 8/1967 | Drake | 280—91 |

KENNETH H. BETTS, Primary Examiner